W. G. Grant,
Pessary,

No. 65,903.    Patented June 18, 1867.

Witnesses
Theo Tusche
J. A. Service

Inventor
W. G. Grant
Per Munn & Co.
Attorneys

United States Patent Office.

W. G. GRANT, OF CLYDE, OHIO.

Letters Patent No. 65,903, dated June 18, 1867.

IMPROVED PESSARY.

*The Schedule referred to in these Letters Patent and making part of the same.*

TO ALL WHOM IT MAY CONCERN:

Be it known that I, W. G. GRANT, of Clyde, in the county of Sandusky, and State of Ohio, have invented a new and improved Pessary; and I do hereby declare that the following is a full, clear, and exact description thereof, which will enable those skilled in the art to make and use the same, reference being had to the accompanying drawings, forming part of this specification.

The present invention relates to a sponge pessary to be used as a support and covering to the mouth and neck of the uterus in cases of female weakness and other affections of the uterus; and the invention consists in making such pessary hollow, and of such an internal shape as to fit about and encase and cover both sides and open end of the neck of the uterus when placed thereon, and a conical or tapering shape upon its outside, whereby it can be the more easily inserted or withdrawn, according as may be desired, and when worn rendered the more comfortable and agreeable in feeling to the person or wearer. In the accompanying plate of drawings my improved pessary is illustrated—

Figure 1:
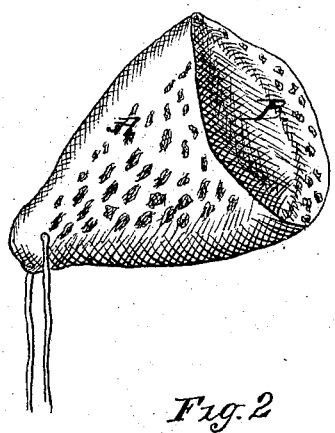

Figure 1 being a perspective view of the pessary, and

Figure 2:
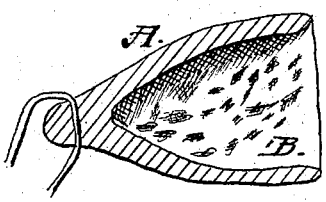

Figure 2 a central section through the pessary in the direction of its length.

A, in the drawings, represents my improved pessary, which is made of a sponge. This pessary A is made hollow, and of a shape upon its inside B to fit about and over the sides and open end of the neck to the uterus, and to closely encase and hold the same, while upon its outside it is made of a conical or tapering shape from end to end.

By making the pessary of a conical shape it can be inserted or withdrawn, according as may be desired, with greater ease and facility, a string or other suitable cord being attached to the pessary to enable it to be drawn out, while to insert it a "director," such as is described in the schedule annexed to the Letters Patent granted me on the 22d day of January, 1867, may be employed.

By forming the sponge pessary of the shape herein described it fits the neck of the uterus more perfectly, and thus affords a better support to it when placed therein for the relief and cure of female weaknesses, as well as other diseases or affections of such part.

I claim as new, and desire to secure by Letters Patent—

A sponge pessary, made of conical shape A outside, and provided with the hollow B, substantially as described for the purpose specified.

W. G. GRANT.

Witnesses:
J. ZEPERNICK,
HIRAM L. WANZER.